United States Patent
Wang et al.

(10) Patent No.: US 8,031,786 B2
(45) Date of Patent: Oct. 4, 2011

(54) METHOD AND SYSTEM FOR IMPROVING CHANNEL ESTIMATION IN A COMMUNICATIONS NETWORK

(75) Inventors: Genyuan Wang, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 725 days.

(21) Appl. No.: 11/845,632

(22) Filed: Aug. 27, 2007

(65) Prior Publication Data

US 2008/0101489 A1    May 1, 2008

Related U.S. Application Data

(60) Provisional application No. 60/854,215, filed on Oct. 25, 2006.

(51) Int. Cl.
*H04K 1/10* (2006.01)
(52) U.S. Cl. ........ 375/260; 375/259; 375/316; 370/343; 370/345; 370/347; 370/286; 370/289; 370/290
(58) Field of Classification Search .............. 375/260, 375/259, 316; 370/343, 345, 347, 286, 289, 370/290
See application file for complete search history.

(56) References Cited

U.S. PATENT DOCUMENTS

| | | | |
|---|---|---|---|
| 2004/0066773 A1 | 4/2004 | Sun et al. | |
| 2004/0184399 A1 | 9/2004 | Chiou | |
| 2005/0176436 A1 * | 8/2005 | Mantravadi et al. | 455/450 |
| 2005/0243791 A1 * | 11/2005 | Park et al. | 370/343 |
| 2006/0165128 A1 * | 7/2006 | Peake et al. | 370/503 |
| 2006/0209883 A1 | 9/2006 | Suzuki | |
| 2006/0222097 A1 | 10/2006 | Gupta et al. | |
| 2006/0233268 A1 | 10/2006 | Frank et al. | |
| 2008/0084942 A1 * | 4/2008 | Hosseinian | 375/260 |

OTHER PUBLICATIONS

PCT International Search Report and Written Opinion of the International Searching Authority, Mar. 6, 2008.

* cited by examiner

*Primary Examiner* — Dac Ha
*Assistant Examiner* — Zewdu Kassa

(57) ABSTRACT

The present invention discloses a method for improving channel estimation in a communications network. The method comprises estimating first channel characteristics of first sub-carriers carrying pilot signals; obtaining second channel characteristics of second sub-carriers carrying data using the first channel characteristics of the first sub-carriers with an algorithm that comprises selecting a first process from the group consisting of two-dimensional interpolation and extrapolation channel estimation algorithms, breaking down the first process, according to a predetermined rule, into second processes selected from the group consisting of one-dimensional interpolation and extrapolation channel estimation algorithms, and calculating the second channel characteristics of the second sub-carriers carrying data; demodulating and decoding the data carried in the second sub-carriers using the second channel characteristics; obtaining channel information about the first and the second channel characteristics from demodulating and decoding the data; and revising the first and the second channel characteristics using the channel information.

20 Claims, 2 Drawing Sheets

METHOD AND SYSTEM FOR IMPROVING CHANNEL ESTIMATION IN A COMMUNICATIONS NETWORK

CROSS REFERENCE

The present application claims the benefit of U.S. Provisional Application Ser. No. 60/854,215, which was filed on Oct. 25, 2006.

BACKGROUND

The present invention relates to a method for improving the accuracy of a channel estimation process in a communications network. More specifically, it relates to estimating a channel response function of all sub-carriers in a network employing an Orthogonal Frequency Division Multiplexing (OFDM) method, based on unevenly distributed pilot signals.

Channel estimation for receivers in a wireless communications network is performed by using training signals or pilot signals. In a network employing an Orthogonal Frequency Division Multiplexing (OFDM) method, a training signal occupies all sub-carriers of an OFDM symbol while a pilot signal only uses a portion of the sub-carriers of an OFDM symbol.

Since it takes all sub-carriers to send a training signal, the network incurs high overhead and thus reduces the available channel bandwidth. In addition, training signals must be transmitted regularly, which also results in a decrease in bandwidth. Therefore, it is not practical or efficient for a network employing a burst mode transmission method for high data rate applications to use training signals for channel estimation On the other hand, a pilot signal uses only a portion of the sub-carriers of an OFDM symbol, which makes it a better choice for channel estimation. In a burst mode transmission, predetermined pilot signals are inserted into the data stream. The predetermined pilot signals facilitate channel tracking and channel estimation for coherent detection.

Predetermined pilot signals are distributed evenly or unevenly in the time and frequency domains, i.e. the pilot signals occupy some sub-carriers at some of the times evenly or unevenly. In a wireless communications network equipped with multiple antennas, having an antenna adds another dimension for the distribution of pilot signals, i.e. the pilot signals occupy some sub-carriers at some of the times on some of the antennas.

The channel characteristics of pilot sub-carriers are correlated. The degree of correlation depends on the difference in frequency, namely the "distance" between the sub-carriers. The closer the two sub-carriers are, the more correlated their channel characteristics are. The channel characteristics of data sub-carriers are estimated based on the channel characteristics of the neighboring pilot sub-carriers.

Conventional channel estimation algorithms use training signals or evenly distributed pilot signals to compute channel characteristic information, and they may incorporate some type of decision feedback mechanism. These algorithms, however, do not guarantee accurate channel information due to the fact that pilot or training signals are often impaired by channel noise, interference, Doppler shift effect, and a frequency offset of a mobile channel. In other words, the channel characteristics are estimated with impaired signals.

As such, what is desired is a method and system for improving the accuracy of channel estimation based on unevenly distributed pilot signals for high data rate burst mode communications networks, such as (WiMAX).

SUMMARY

The present invention discloses a method for improving channel estimation in a communications network. The method comprises estimating a first plurality of channel characteristics of one or more first sub-carriers carrying a plurality of pilot signals, obtaining a second plurality of channel characteristics of one or more second sub-carriers carrying data using the first plurality of channel characteristics of the one or more first sub-carriers with an algorithm comprising: selecting a first process from the group consisting of two-dimensional interpolation and extrapolation channel estimation algorithms, breaking down the first process, according to a predetermined rule, into a plurality of second processes selected from the group consisting of one-dimensional interpolation and extrapolation channel estimation algorithms, calculating the second plurality of channel characteristics of one or more second sub-carriers carrying data, demodulating and decoding the data carried in the one or more second sub-carriers using the second plurality of channel characteristics, obtaining channel information about the first and the second plurality of channels from demodulating and decoding the data; and revising the first and the second plurality of channel characteristics using the channel information.

The construction and method of operation of the invention, however, together with additional objects and advantages thereof, will be best understood from the following description of specific embodiments when read in connection with the accompanying drawings.

BRIEF DESCRIPTION OF THE DRAWING

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale.

DESCRIPTION

The following detailed description of the invention refers to the accompanying drawings. The description includes exemplary embodiments, not excluding other embodiments, and changes may be made to the embodiments described without departing from the spirit and scope of the invention. The following detailed description does not limit the invention. Instead, the scope of the invention is defined by the appended claims.

The present invention discloses a method and system for improving the accuracy of a channel estimation process in which the channel response function of all sub-carriers is estimated based on unevenly distributed pilot signals. The channel information derived from the pilot signals is used to assist the decoding of receiving data. The decoded data is sent to the channel estimation process and used as "virtual pilot signals" to further improve the accuracy of the channel estimation. The disclosed method and system is suitable for estimating mobile channels with evenly or unevenly distributed pilot signals, and it is also applicable to low-speed wireless networks.

Figure 1:
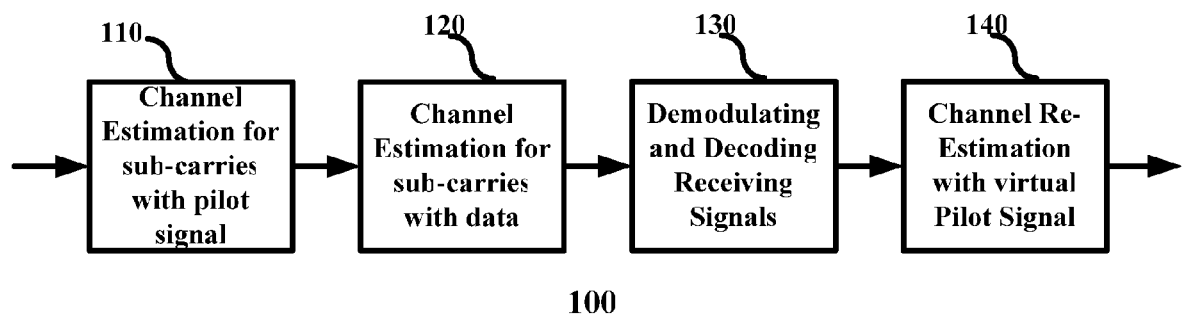
FIG. 1 is a flow diagram illustrating a method in accordance with an embodiment of the present invention.

FIG. 1 is a flow diagram illustrating a method 100 in accordance with an embodiment of the present invention. The method 100 begins with an initial channel estimation process in step 110 which results in an acquiring of the channel characteristics of pilot sub-carriers. The pilot signals do not distribute evenly in a two-dimensional space of frequency and time.

In step 120, channel characteristics of data sub-carriers are constructed from those of pilot sub-carriers by using an interpolation or extrapolation technique, which is based on a function of two variables (frequency and time). This kind of technique is referred to as a two-dimensional interpolation or extrapolation channel estimation algorithm, and in short a two-dimensional channel estimation algorithm henceforward.

A two-dimensional interpolation channel estimation algorithm can be implemented by applying a one-dimensional interpolation channel estimation algorithm iteratively for a variable number of times. This is also true for a two-dimensional extrapolation channel estimation algorithm.

A one-dimensional interpolation or extrapolation channel estimation algorithm is based on a function of one variable, which is frequency, time, or a third variable which is a function of frequency and time. A one-dimensional interpolation or extrapolation channel estimation algorithm is referred to as one-dimensional channel estimation algorithm henceforward.

There is more than one way to decompose a two-dimensional channel estimation algorithm into a sequence of one-dimensional channel estimation algorithms. Applying different sequences of one-dimensional channel estimation algorithms produces different outcomes. A weight can be assigned to each of the sequence according to the accuracy of its outcome.

One way to assign a weight to a one-dimensional channel estimation algorithm is to use the distance between two data points as the criterion for determining the weight. If one-dimensional channel estimation algorithms operate in the frequency domain, the algorithm that uses sub-carriers that are closer to each other has a higher weight than one that uses sub-carriers that are farther apart. As a result, when applying the iterative technique, the order of one-dimensional channel estimation algorithms is important.

When multiple one-dimensional channel estimation algorithms are available for estimating the channel characteristics of a sub-carrier, the one with the highest weight is chosen. Or, the channel characteristics of a sub-carrier can be computed by taking the weighted average of the outcomes of multiple one-dimensional channel estimation algorithms.

A one-dimensional channel estimation algorithm generates the channel characteristics of sub-carriers that fall between sub-carriers carrying unevenly distributed pilot signals. The newly generated channel information is subsequently used in another channel estimation process to compute the channel characteristics of the remaining sub-carriers. The process continues until the channel characteristics of all sub-carriers are estimated.

In step 130, a receiving signal is decoded by utilizing the channel characteristics of the data carrying sub-carriers. Typically, a wireless communications network operates in an environment where the Signal-to-Noise-Ratio of a wireless channel supports a bit error rate in a range of 10-5 to 10-6. In such an environment, transmitting signals are usually received correctly.

Channel information such as the probability of errors in the demodulated signal and the presence of a cyclic redundant code error in the decoded data, can further benefit the channel estimation process. The receiving data is used as "virtual pilot signals" to further improve the accuracy of the estimated channel characteristics.

The channel information retrieved from the decoded data is sent to the channel estimation process (step 140) to revise the channel characteristics of all sub-carriers. The revision process can rely solely on the channel information retrieved from the decoded data alone. It can also rely on both the channel information retrieved from the decoded data and the weighted channel information obtained from pilot sub-carriers.

Figure 2:
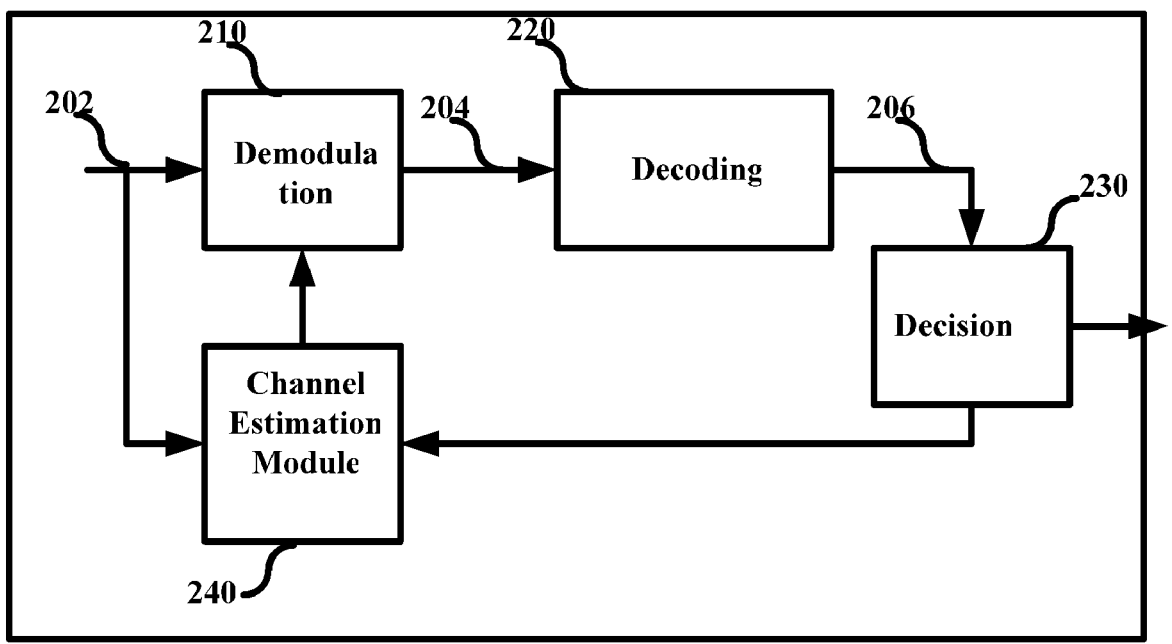
FIG. 2 is a block diagram illustrating an implementation of the method shown in FIG. 1.

FIG. 2 is a block diagram illustrating a system 200 implementing the disclosed method 100 of FIG. 1. The system 200 comprises a de-modulation module 210, a decoding module 220, a decision module 230, and a channel estimation module 240.

A receiving signal 202 is sent to the de-modulation module 210 and the channel estimation module 240. The de-modulation module 210 uses the channel information from the channel estimation module 240 to demodulate the receiving signal 202. The decoding module 220 decodes the receiving signal 202 and generates decoded data 206.

The channel estimation module 240 estimates the channel characteristics of pilot sub-carriers. It further estimates the channel characteristics of data sub-carriers using the pilot sub-carriers' channel information and the data sub-carriers' channel information, which is obtained by the decision module 230, as described above in step 120.

After obtaining the decoded data 206, the decision module 230, following a set of predetermined rules, decides whether the channel information contained in the decoded data 206 should be sent to the channel estimation module 240 to further revise the channel characteristics of the sub-carriers. A decision is made based on soft information, i.e. the probability of errors in the demodulated and decoded data, and/or the number of iterations in the feedback loop, which is formed by the de-modulation module 210, the decoding module 220, the decision module 230, and the channel estimation module 240. The revision process of the channel estimation ends when the number of iterations exceeds a predetermined threshold.

If a wireless receiver includes an error detection code (EDC) decoder, the decision module 230 can take into consideration the presence of a cyclic redundant code (CRC) error in the decoded data. If there is a CRC error in the decoded data, the channel information retrieved from data sub-carriers is sent back to the channel estimation process to further refine the channel characteristics of the sub-carriers.

The decision module 230 forwards the channel information retrieved from the decoded data to the channel estimation module 240 to further revise the channel characteristics of one or more sub-carriers. The channel information retrieved from the decoded data could be soft or hard information.

The channel estimation module 240 re-computes the channel characteristics by either using the channel information retrieved from the decoded data alone or by combining the channel information retrieved from the decoded data with the weighted channel information obtained from pilot sub-carriers.

The receiver of a wireless communications device can request a sender to re-transmit data one or more times. It then combines the channel information retrieved from one or more consecutive transmissions to further revise the channel characteristics of the sub-carriers. The decoded data 206 is sent to the next processing unit in the receiver chain.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method comprising:
   at a wireless communication device, receiving a wireless transmission comprising a plurality of sub-carriers;
   estimating a first group of channel characteristics of one or more first sub-carriers carrying a plurality of pilot signals; and
   generating a second group of channel characteristics of one or more second sub-carriers carrying data, wherein generating the second group of channel characteristics from the first sub-carriers comprises:
      selecting one of an interpolation and extrapolation technique with respect to values of the first sub-carriers based on one of a relative frequency, relative time and a combination of relative frequency and relative time of the first sub-carriers;
      decomposing the selected interpolation or extrapolation technique into a sequence of one-dimensional computations of the first sub-carriers;
      assigning a weight to each of the one-dimensional computations based on a distance between the first sub-carriers and the one or more second sub-carriers;
      computing a weighted average of outcomes of the one-dimensional computations based on the weight assigned to each of the one-dimensional computations;
      generating the second group of channel characteristics based on the weighted average of the outcomes of the one-dimensional computations;
   demodulating and decoding data carried in the second sub-carriers from the second group of channel characteristics;
   obtaining channel information from demodulating and decoding the data; and
   revising the first and the second group of channel characteristics using the channel information obtained from the decoded data.

2. The method of claim 1, wherein estimating comprises estimating the first group of channel characteristics from the first sub-carriers that are evenly distributed across frequency and time.

3. The method of claim 1, wherein estimating comprises estimating the first group of channel characteristics of the first sub-carriers that are unevenly distributed across frequency and time.

4. The method of claim 1, wherein decomposing comprises decomposing the selected one of the interpolation and extrapolation technique into multiple different sequences of one-dimensional computations each of which produces different outcomes, and wherein assigning comprises assigning weights to the outcomes based on a distance in time or frequency between pilot sub-carriers for which the one-dimensional computation is performed.

5. The method of claim 1, wherein assigning comprises assigning a higher weight to an outcome of a sequence of one-dimensional computations that is based on first sub-carriers that are relatively close in time or frequency.

6. The method of claim 1, and further comprising computing a weighted average of outcomes from multiple sequences of one-dimensional computations.

7. The method of claim 1, further comprising:
   using the first group of channel characteristics to compute a third group of channel characteristics of one or more third sub-carriers carrying data, which third sub-carriers fall between two or more sub-carriers carrying pilot signals; and
   using the first and the third groups of channel characteristics to calculate at least one fourth group of channel characteristics of remaining sub-carriers carrying data, which do not fall between the two or more sub-carriers carrying the pilot signals.

8. The method of claim 1, wherein obtaining comprises obtaining channel information that includes the probability of errors in the demodulated signal.

9. The method of claim 1, wherein obtaining comprises obtaining channel information that includes a cyclic redundant code error in the decoded data.

10. A system comprising:
    a demodulating module;
    a decoding module;
    a channel estimation module; and
    a decision module;
    wherein the demodulating module is configured to use channel information from the channel estimation module to demodulate a received signal comprising a plurality of sub-carriers;
    wherein the decoding module is configured to decode the received signal and to generate decoded data; and
    wherein the channel estimation module is configured to estimate channel characteristics of a first group of channel characteristics of one or more first sub-carriers carrying a plurality of pilot signals;
    wherein the channel estimation module is configured to generate a second group of channel characteristics of one or more second sub-carriers carrying data by:
       selecting one of an interpolation and extrapolation technique with respect to values of the first sub-carriers based on one of a relative frequency, relative time and a combination of relative frequency and relative time of the first sub-carriers;
       decomposing the selected interpolation or extrapolation technique into a sequence of one-dimensional computations of the first sub-carriers;
       assigning a weight to each of the one-dimensional computations based on a distance between the first sub-carriers and the one or more second sub-carriers;
       computing a weighted average of outcomes of the one-dimensional computations based on the weight assigned to each of the one-dimensional computations;
       generating the second group of channel characteristics based on the weighted average of outcomes of the one-dimensional computations; and
    wherein the channel estimation module is configured to revise the channel characteristics of the first and the second pluralities of sub-carriers by using the channel information retrieved from the decoded data.

11. The system of claim 10, wherein the channel estimation module is further configured to decompose the selected one of the interpolation and extrapolation technique into multiple different sequences of one-dimensional computations each of which produces different outcomes, and wherein the channel estimation module is configured to assign weights to the outcomes based on a distance in time or frequency between pilot sub-carriers for which the one-dimensional computation is performed.

12. The system of claim 10, wherein the channel estimation module is further configured to use channel information retrieved from one or more retransmitted data sub-carriers.

13. The system of claim 10, wherein the decision module is configured to determine whether to forward the channel characteristics of the first group of sub-carriers to the channel estimation module in order to further revise the channel characteristics of the first and the second groups of sub-carriers.

14. The system of claim 13, wherein the decision module is further configured to determine whether to further revise the channel characteristics based on information including probability of errors in the decoded data.

15. The system of claim 13, wherein the decision module is further configured to determine whether to further revise the channel characteristics based on information including a number of iterations of a revision process.

16. The system of claim 10, wherein the decision module is configured to determine whether to forward the channel characteristics of the first group of sub-carriers to the channel estimation module in order to further revise the channel characteristics of the first and the second groups of sub-carriers.

17. The system of claim 16, wherein the decision module is further configured to determine whether to further revise the channel characteristics based on information including a cyclic redundancy code error.

18. The system of claim 10, wherein the decision module is further configured to determine whether to request a sender of the data to re-transmit the data.

19. The system of claim 10, wherein the channel estimation module is configured to estimate channel characteristics of the first group of sub-carriers using the second group of sub-carriers carrying pilot signals that are unevenly distributed across frequency and time.

20. The system of claim 10, wherein the channel estimation module is configured to estimate channel characteristics of the first group of sub-carriers using the second group of sub-carriers carrying pilot signals that are evenly distributed across frequency and time.

\* \* \* \* \*